United States Patent
Sohn

(10) Patent No.: US 12,448,674 B2
(45) Date of Patent: Oct. 21, 2025

(54) COMPOSITE PLATED STEEL SHEET HAVING EXCELLENT POST-FORMATION CORROSION RESISTANCE, AND MANUFACTURING METHOD THEREFOR

(71) Applicant: POSCO Co., Ltd, Pohang-si (KR)

(72) Inventor: Il-Ryoung Sohn, Gwangyang-si (KR)

(73) Assignee: POSCO CO., LTD, Pohang-si (KR)

(*) Notice: Subject to any disclaimer, the term of this patent is extended or adjusted under 35 U.S.C. 154(b) by 22 days.

(21) Appl. No.: 18/267,319

(22) PCT Filed: Dec. 10, 2021

(86) PCT No.: PCT/KR2021/018725
§ 371 (c)(1),
(2) Date: Jun. 14, 2023

(87) PCT Pub. No.: WO2022/131692
PCT Pub. Date: Jun. 23, 2022

(65) Prior Publication Data
US 2024/0043701 A1 Feb. 8, 2024

(30) Foreign Application Priority Data

Dec. 18, 2020 (KR) .................. 10-2020-0179007

(51) Int. Cl.
*C22C 38/00* (2006.01)
*C08L 67/00* (2006.01)
(Continued)

(52) U.S. Cl.
CPC ............... *C23C 2/26* (2013.01); *C08L 67/00* (2013.01); *C09D 5/08* (2013.01); *C09D 167/00* (2013.01);
(Continued)

(58) Field of Classification Search
CPC ....... C22C 38/002; C22C 38/02; C22C 38/04; C22C 38/06; C23C 2/06; C23C 2/40
(Continued)

(56) References Cited

U.S. PATENT DOCUMENTS

2009/0011274 A1 1/2009 Ogata et al.
2010/0014024 A1 1/2010 Tatsumi et al.
(Continued)

FOREIGN PATENT DOCUMENTS

EP 0380024 A2 8/1990
EP 1524332 A1 4/2005
(Continued)

OTHER PUBLICATIONS

Hatano et al, JP3183079B2 Google Patents Machine translation printed on Sep. 17, 2024, Jul. 7, 2001, entire translation (Year: 2018).*

(Continued)

*Primary Examiner* — Katherine A Christy
(74) *Attorney, Agent, or Firm* — Morgan Lewis & Bockius LLP

(57) ABSTRACT

A composite plated steel sheet including a base steel sheet; a Zn—Mg—Al-based plating layer provided on at least one surface of the base steel sheet; and a resin layer provided on at least one surface of the Zn—Mg—Al-based plating layer. The resin layer includes a base resin and resin powder. A hardness of the resin powder is 1.1 to 2 times that of the base resin.

15 Claims, 1 Drawing Sheet

(51) Int. Cl.

| | | |
|---|---|---|
| *C09D 5/08* | (2006.01) | |
| *C09D 167/00* | (2006.01) | |
| *C22C 18/04* | (2006.01) | |
| *C22C 38/02* | (2006.01) | |
| *C22C 38/04* | (2006.01) | |
| *C22C 38/06* | (2006.01) | |
| *C23C 2/06* | (2006.01) | |
| *C23C 2/12* | (2006.01) | |
| *C23C 2/26* | (2006.01) | |
| *C23C 2/40* | (2006.01) | |

(52) U.S. Cl.
CPC ............ *C22C 18/04* (2013.01); *C22C 38/002* (2013.01); *C22C 38/02* (2013.01); *C22C 38/04* (2013.01); *C22C 38/06* (2013.01); *C23C 2/06* (2013.01); *C23C 2/12* (2013.01); *C23C 2/265* (2013.01); *C23C 2/40* (2013.01)

(58) Field of Classification Search
USPC .......................................................... 428/626
See application file for complete search history.

(56) References Cited

U.S. PATENT DOCUMENTS

| | | | |
|---|---|---|---|
| 2014/0349133 A1 | 11/2014 | Lee et al. | |
| 2015/0083276 A1 | 3/2015 | Nakano et al. | |
| 2017/0096573 A1* | 4/2017 | Matsuno | ............ C23C 22/80 |
| 2017/0216881 A1 | 8/2017 | Takaoka et al. | |

FOREIGN PATENT DOCUMENTS

| | | | |
|---|---|---|---|
| EP | 2821223 A1 | 1/2015 | |
| JP | H08-183928 A | 7/1996 | |
| JP | H09-254312 A | 9/1997 | |
| JP | 3183079 B2 * | 7/2001 | ............ C23C 28/00 |
| JP | 2005-015834 A | 1/2005 | |
| JP | 2006-219731 A | 8/2006 | |
| JP | 2007-175975 A | 7/2007 | |
| JP | 2007-269010 A | 10/2007 | |
| JP | 2009-011950 A | 1/2009 | |
| JP | 2013-241672 A | 12/2013 | |
| JP | 2015-500925 A | 1/2015 | |
| KR | 10-2013-0073421 A | 7/2013 | |
| KR | 10-2014-0083814 A | 7/2014 | |
| KR | 10-2015-0002669 A | 1/2015 | |
| KR | 10-1789270 B1 | 10/2017 | |
| KR | 10-2018-0069371 A | 6/2018 | |
| KR | 10-2019-0061206 A | 6/2019 | |
| WO | 2013/128928 A1 | 9/2013 | |

OTHER PUBLICATIONS

Baskaran et al., "Mechanical and thermal properties of unsaturated polyester-silica nanocomposites", Nano Science and Nano Tehcnology, vol. 4 Issue 1, Jun. 2010, URL: <https://www.tsijournals.com/articles/mechanical-and-thermal-properties-of-unsaturated-polyestersilica-nanocomposites.pdf>, pp. 1-5 (Year: 2010).*

Laminated Plastics, "Technical Data Sheet Teflon (PTFE)", Mar. 4, 2018, URL: <https://www.tsijournals.com/articles/mechanical-and-thermal-properties-of-unsaturated-polyestersilica-nanocomposites.pdf> p. 1 (Year: 2018).*

The plastic shop, Virgin PTFE-Detailed Technical Information, Jun. 15, 2015, URL: <https://web.archive.org/web/20150629143636/https://www.theplasticshop.co.uk/ptfe-technical-information.html>, pp. 1-3 (Year: 2015).*

Precision Urethane & Machine, Inc., "Cast Urethane Hardness Data", Mar. 24, 2018, URL: <https://web.archive.org/web/20180324164633/https://www.precisionurethane.com/hardness-chart.html>, pp. 1-3 (Year: 2018).*

Extended European Search Report issued Jan. 19, 2024 for European Patent Application No. 21906996.0.

International Search Report dated Apr. 22, 2022, issued in International Patent Application No. PCT/KR2021/018725 (with English translation).

Japanese Office Action dated Oct. 8, 2024 issued in Japanese Patent Application No. 2023-536478 (with English translation).

* cited by examiner

*-RELATED ART-*

COMPOSITE PLATED STEEL SHEET HAVING EXCELLENT POST-FORMATION CORROSION RESISTANCE, AND MANUFACTURING METHOD THEREFOR

CROSS-REFERENCE OF RELATED APPLICATIONS

This application is the U.S. National Phase under 35 U.S.C. § 371 of International Patent Application No. PCT/KR2021/018725, filed on Dec. 10, 2021, which in turn claims the benefit of Korean Application No. 10-2020-0179007, filed on Dec. 18, 2020, the disclosures of which applications are incorporated by reference herein.

TECHNICAL FIELD

The present disclosure relates to a plated steel sheet having excellent post-formation corrosion resistance and a manufacturing method thereof.

BACKGROUND ART

When exposed to a corrosive environment, zinc-based plated steel sheet has characteristics of a sacrificial method in which zinc, which has a lower oxidation-reduction potential than iron, corrodes first, to inhibit corrosion of steel. In addition, while the zinc in the plating layer is oxidized, a dense corrosion product is formed on a surface of the steel material to block the steel material from the oxidizing atmosphere, to thereby improve the corrosion resistance of the steel material. Due to these advantageous properties, the zinc-based plated steel sheet has recently been expanding its application range to steel sheets for construction materials, home appliances, and automobiles.

However, since a corrosive environment is gradually deteriorating due to the increase in air pollution due to industrial advancement and regulations on resource and energy conservation are strict, the need for developing steel materials with better corrosion resistance than the conventional zinc-based plated steel sheet is increasing.

In order to improve these problems, various studies are being conducted on manufacturing techniques of zinc-based plated steel sheets that improve corrosion resistance of steel materials by adding elements such as aluminum (Al) and magnesium (Mg) to a galvanizing bath. As a representative example, there is a Zn—Mg—Al-based zinc alloy plated steel sheet in which Mg is additionally added to a Zn—Al plating composition system.

The Zn—Mg—Al-based zinc alloy plated steel sheet contains phases resistant to brittleness such as a $MgZn_2$ phase and Zn—$MgZn_2$ (binary phase) in a plating layer, so cracks are likely to occur in the plating layer during processing. Cracks generated in the plating layer are transferred to a coating layer (resin layer) provided on the plating layer and cause coating burst, resulting in a decrease in corrosion resistance of the steel plate.

Therefore, the inventors of the present disclosure conducted research on a composite plated steel sheet capable of inhibiting cracks in the plating layer and at the same time minimizing the spread of cracks in the coating layer even if cracks occur in the coating layer.

RELATED ART DOCUMENT

Patent Document (Patent Document 1) Korean Patent Laid-Open Publication No. 10-2014-0083814

DISCLOSURE

Technical Problem

The present disclosure provides a composite plated steel sheet, which has excellent post-formation corrosion resistance by preventing the spread of cracks in a resin layer even if cracks occur in the plating layer of the composite plated steel sheet.

Another object of the present disclosure provides a method for manufacturing a composite plated steel sheet having excellent post-formation corrosion resistance.

Technical Solution

In an aspect in the present disclosure, a composite plated steel sheet may include:
  a base steel sheet;
  a Zn—Mg—Al-based plating layer provided on at least one surface of the base steel sheet; and
  a resin layer provided on at least one surface of the Zn—Mg—Al-based plating layer,
  in which the resin layer includes a base resin and resin powder, and
  a hardness of the resin powder is 1.1 to 2 times that of the base resin.

In another aspect in the present disclosure, a method for manufacturing a composite plated steel sheet may include:
  preparing a base steel sheet;
  forming a Zn—Mg—Al-based plating layer on at least one surface of the base steel sheet; and
  forming a resin layer containing a base resin and resin powder on at least one surface of the Zn—Mg—Al-based plating layer,
  in which a hardness of the resin powder is 1.1 to 2 times that of the base resin.

Advantageous Effects

As set forth above, according to the present disclosure, it is possible to provide a composite plated steel sheet with excellent post-formation corrosion resistance capable of preventing cracks generated in a plating layer from spreading to the resin layer by mixing resin powder with high hardness into a resin layer of the composite plated steel sheet.

In addition, according to the present disclosure, it is possible to provide a method for manufacturing a composite plated steel sheet having excellent post-formation corrosion resistance.

BEST MODE

Figure 1:
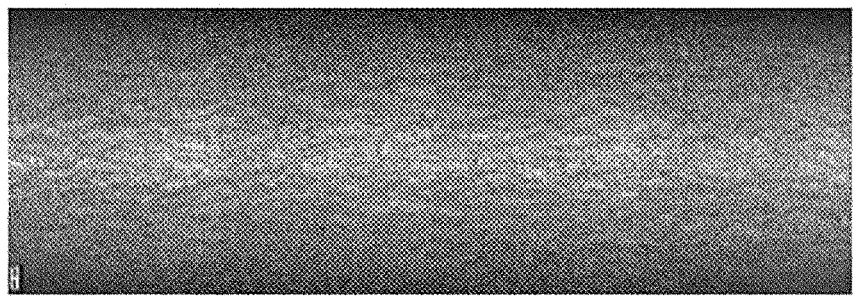
FIG. 1 is a diagram of an observed bending line after performing bending processing on a composite plated steel sheet specimen of Example 5 according to an aspect of the present disclosure.

Hereinafter, exemplary embodiments of the present disclosure will be described. However, exemplary embodiments in the present disclosure may be modified in several other forms, and the scope of the present disclosure is not limited to exemplary embodiments to be described below.

According to one aspect of the present disclosure, a composite plated steel sheet includes: a base steel sheet; a Zn—Mg—Al-based plating layer provided on at least one surface of the base steel sheet; and a resin layer provided on at least one surface of the Zn—Mg—Al-based plating layer.

In the present disclosure, a type of the base steel sheet is not particularly limited. For example, the base steel sheet may be a Fe-based base steel sheet, that is, a hot-rolled steel sheet or a cold-rolled steel sheet, which is used as a base steel sheet of a conventional zinc-based plated steel sheet, but is not limited thereto. Alternatively, the base steel sheet may be, for example, carbon steel, ultra-low carbon steel, or high manganese steel used as a material for construction, home appliances, and automobiles.

However, as a non-limiting example, the base steel sheet may have a composition containing, by wt %, C: 0.17% or less (not including 0), Si: 1.5% or less (not including 0), Mn: 0.01 to 2.7%, P: 0.07% or less (not including 0), S: 0.015% or less (not including 0), Al: 0.5% or less (not including 0), Nb: 0.06% or less (not including 0), Cr: 1.1% or less (including 0), Ti: 0.06% or less (not including 0), B: 0.03% or less (not including 0), and the balance being Fe and other unavoidable impurities.

According to an aspect of the present disclosure, a Zn—Mg—Al-based plating layer formed of a Zn—Mg—Al-based alloy may be provided on at least one surface of the base steel sheet. The plating layer may be formed on only one surface of the base steel sheet, or may be formed on both surfaces of the base steel sheet. In this case, the Zn—Mg—Al-based plating layer refers to a plating layer containing Mg and Al and containing 50% or more of Zn.

In addition, according to an aspect of the present disclosure, a Fe—Al-based inhibition layer may be provided between the base steel sheet and the Zn—Mg—Al-based plating layer. The Fe—Al-based inhibition layer is a layer containing an intermetallic compound of Fe and Al, and examples of the intermetallic compound of Fe and Al include FeAl, $FeAl_3$, $Fe_2Al_5$, and the like. In addition, some components derived from the plating layer, such as Zn and Mg, may be further included, for example, 40% or less. The inhibition layer is a layer formed due to alloying by Fe diffused from the base steel sheet in an initial stage of plating and plating bath components. The inhibition layer may serve to improve adhesion between the base steel sheet and the plating layer, and at the same time prevent diffusion of Fe from the base steel sheet to the plating layer.

According to an aspect of the present disclosure, the plating layer may include, by wt %, Mg: 4 to 10%, Al: 5.1 to 25%, Si: 0.3% or less (excluding 0%), and the balance being Zn and unavoidable impurities, based on components other than iron (Fe) diffused from the base steel sheet.

Mg: 1.0 to 6.0%

Mg is an element that serves to improve a corrosion resistance of a zinc alloy plated steel sheet, and may effectively prevent the corrosion of the zinc-based plated steel sheet by forming a dense zinc hydroxide-based corrosion product on a surface of a plating layer under a corrosive environment. In order to express the above effect, in the present disclosure, the content of Mg in the plating layer is controlled to be 1.0% or more. However, when the content of Mg in the plating layer is excessive, the corrosion resistance improvement effect due to the addition of Mg is no longer improved, but the generation of floating dross in the plating bath due to the oxidation of Mg in the plating bath increases, so it is necessary to remove the dross frequently. Therefore, in the present disclosure, the Mg content is controlled to be 6.0% or less.

Al: 1.5 to 13%

Al is an element that serves to inhibit the above-described dross generation, and the Al content in the plating layer is preferably 1.5% or more. However, when excessive Al is added to inhibit the generation of dross, the melting point of the plating bath increases and the operating temperature accordingly becomes too high, so problems caused by high-temperature operation, such as erosion of plating bath structures and degeneration of steel materials, may occur. In addition, when the content of Al in the plating bath is excessive, Al reacts with Fe of base iron and does not contribute to the formation of a Fe—Al inhibition layer, but a reaction that contributes to the formation of an outburst phase occurs quickly, so the lumpy outburst phase is excessively formed, resulting in deterioration in corrosion resistance. Therefore, the upper limit of the content of Al in the plating layer is preferably controlled to be 13%.

Si: 0.3% or Less (Excluding 0%)

Si serves to impart ductility by being dissolved in the Fe—Al compound when forming the inhibition layer of the zinc alloy plated steel sheet. When the Si is not precipitated as $Mg_2Si$ and is concentrated in the inhibition layer, it is advantageous in improving the adhesion and fracture toughness of the plating layer. However, when the content of Si in the plating layer increases, when the roughness or shape of the surface of the steel sheet is non-uniform, $Mg_2Si$ precipitates having brittleness are formed coarsely at an interface between the plating layer and the base steel sheet, which rather causes cracks against external stress. Therefore, it is preferable that the content of Si does not exceed 0.3%.

Balance being Zn and Other Unavoidable Impurities

In addition to the composition of the plating layer described above, the balance may be Zn and other unavoidable impurities. Any unavoidable impurities may be included as long as they may be unintentionally mixed in the manufacturing process of a normal zinc alloy plated steel sheet, and those skilled in the art may easily understand their meaning.

Meanwhile, a small amount of iron (Fe) may be diffused from the base steel sheet in the plating layer and included in the plating layer. The content of the iron component included in the plating layer is extremely small and corresponds to the level of impurities, which may not be defined separately.

According to one aspect of the present disclosure, the average content of Fe at a ½ point of the plating layer in the thickness direction may be 0.07% or less (including 0%). Here, the thickness direction of the plating layer means a direction perpendicular to the rolling direction of the plated steel sheet.

In an aspect of the present disclosure, Fe, which may be included in the plating bath, requires management of its content, and specifically, a small amount of iron (Fe) introduced from the base iron may be included in the Zn—Mg—Al-based plating bath. When the content of Fe increases in the plating bath, the Fe reacts with Al to form fine FeAl crystals, which may cause plating defects when mixed in the plating layer. Therefore, as a management index, it is necessary to perform production management so that the content of Fe is within 0.007% at the midpoint in the thickness direction for the Zn—Mg—Al-based plating layer. When the average content of Fe exceeds 0.07% at a ½ point of the plating layer in the thickness direction, there is a concern that the cracks of the plating layer due to stress may increase.

According to an aspect of the present disclosure, the ratio of Al and Mg (Al/Mg) in the plating layer may be 0.7 to 3.0. When the Al/Mg is less than 0.7, the excessive dross may occur on the surface of the plating bath, so that surface defects may increase. On the other hand, when the Al/Mg ratio exceeds 3.0, the Al phase increases in the plating layer structure, and the corrosion resistance of the plating layer may deteriorate.

Meanwhile, since the cracks in the plating layer mainly occur in the $MgZn_2$ phase having strong brittleness and the large-structured Zn—$MgZn_2$ phase, the occurrence or spread of cracks may be inhibited by appropriately controlling the ratio of these phases.

According to one aspect of the present disclosure, the surface of the plating layer or the surface after polishing the plating layer surface to 1 μm or more may include an area containing $MgZn_2$ phase in a phase fraction of 10% or more and less than 80%, preferably 10 to 60%. Here, the area including the $MgZn_2$ phase means an area in which the $MgZn_2$ phase is present alone or present as alloy phases such as Al—$MgZn_2$, Zn—Al—$MgZn_2$, or Zn—$MgZn_2$. Several phases such as a Zn single phase, an Al phase, and a $MgZn_2$ phase may present in the plating layer. Among these phases, a phase having a width of 3 μm or more is determined to be a single phase, and a phase having a width of 3 μm or less and an adjacent phase being $MgZn_2$ is determined to be an alloy phase.

When the phase fraction of the area containing the $MgZn_2$ phase is less than 10%, the corrosion resistance may be lowered, whereas when the phase fraction exceeds 80%, the brittleness of the plating layer may increase and cracks may occur during processing.

These phases present on the surface of the plating layer may be observed using a microscope, and the phases present on the surface after polishing may be measured using the microscope or image analyzer.

Meanwhile, in a separate method, the phase fraction of the $MgZn_2$ phase may be measured by converting a relative weight ratio obtained by calculating the integrated intensity of diffraction peaks of each phase measured from X-ray diffraction (XRD). The instrument used for measuring the specimen of the present disclosure is Rigaku D/Max 2200. In addition, the relative weight ratio may be verified using a Rietveld measurement method, which is a precise phase fraction measurement method, and a state diagram calculation program.

The fact that the plating layer contains 10 to 60% of $MgZn_2$ phase in the phase fraction is due to the content of Al and Mg in the plating bath. For example, when the content of Mg is lower than 1.0%, less than 10% of $MgZn_2$ phase may be generated. Since the hardness of the $MgZn_2$ phase is relatively higher than that of other alloy phases, the hardness of the plating layer may be adjusted by controlling the phase fraction of the $MgZn_2$ phase. When the phase fraction of the $MgZn_2$ phase is less than 10%, the hardness of the plating layer becomes less than 220 Hv, so there may be a problem in that the friction coefficient increases significantly after 30 repetitions or more.

On the other hand, when the phase fraction of the $MgZn_2$ phase exceeds 60%, the $MgZn_2$ phase with high hardness in the plating layer is unevenly and coarsely aggregated. Therefore, the Zn single-phase and Zn—Al—$MgZn_2$ ternary eutectic structures that secure uniform processability are not evenly distributed, and cracks may occur during processing, and corrosion may easily spread through these cracks, resulting in a rapid decrease in corrosion resistance.

According to an aspect of the present disclosure, the Fe—Al-based inhibition layer may have a thickness of 0.02 μm or more and 2.5 μm or less. The inhibition layer serves to secure corrosion resistance by preventing alloying, but since the inhibition layer is brittle, it may adversely affect processability, so the thickness of the inhibition layer may be controlled to be 2.5 μm or less. However, in order to play a role as the inhibition layer, it is preferable to control the thickness of the inhibition layer to be 0.02 μm or more. In this case, the thickness of the inhibition layer may mean a minimum thickness in a direction perpendicular to the interface using an SEM or TEM device.

According to an aspect of the present disclosure, the coating layer may be formed on the plating layer. The coating layer may include a resin layer, and may include a chrome coating layer, a primer coating layer, and the like in addition to the resin layer. In the present disclosure, the resin layer is also referred to as a top coating layer, and as described above, resins having different hardness may be included to prevent spread of cracks in the plating layer to the coating layer.

According to an aspect of the present disclosure, the resin layer may include a base resin and resin powder. The base resin is a soft material, and when deformation occurs during the processing of the plated steel sheet, serves to absorb such processing deformation. As the base resin, it is preferable to use at least one selected from the group consisting of polyester-based resins, urea-based resins, epoxy-based resins, urethane-based resins, and ethylene-based resins, but is not limited thereto.

The base resin may be included in an amount of 30 to 65 wt % based on the total weight of the resin layer. When the content of the base resin is less than 40 wt %, the elasticity of the resin layer is lowered, so the resin layer is highly likely to be damaged. On the other hand, when the content of the base resin exceeds 60 wt %, there is a risk that the resin may be adsorbed to a mold during processing due to the increase in viscosity of the resin.

When the plated steel sheet is processed, if cracks occur in the plating layer beyond the processing deformation, the cracks spread through the base resin. When the cracks deform an outermost resin, and the outermost resin exceeds a crack critical point, cracks also occur in the outermost resin layer. However, when the cracks reach the resin powder, which is a hard material, the crack stops or the spread direction changes, so cracks may be prevented from spreading further.

In order to efficiently prevent the spread of cracks generated in the plating layer, the resin powder having a hardness 1.1 to 2 times greater than that of the base resin may be used. When the hardness ratio is less than 1.1 times, it is difficult to sufficiently inhibit cracks from spreading due to a slight difference in hardness between the base resin and the resin powder. On the other hand, when the difference in hardness exceeds 2 times, stress is concentrated between the resin layer and the resin powder due to the excessive difference in hardness, and cracks may rather expand, which is not preferable.

In the present disclosure, as the resin powder, a polyurethane-based resin, for example, polyester urethane, polyether urethane, etc., may be used, but is not limited thereto, and as described above, any one having a certain hardness ratio with the base resin may be used without limitation.

The content of the resin powder in the resin layer may be 4 to 25 wt %. When the content of the resin powder is less than 4 wt %, the crack spread inhibiting effect is not properly expressed because the content of the resin powder is excessively small, whereas when the content of the resin powder exceeds 25 wt %, the occurrence of cracks may increase due to the decrease in ductility of the resin layer.

The resin powder may be included in an amount of 5 to 30 vol % and preferably 10 to 20 vol %, based on the volume of the resin layer. When the volume ratio of the resin powder is less than 5 vol %, the crack spread inhibiting effect may not be appropriately expressed. On the other hand, when the content of the resin powder exceeds 30 vol %, the ductility of the resin layer may be lowered and the occurrence of cracks may increase.

In addition, the resin powder may have an average surface area of 30 to 700 $\mu m^2$, and preferably 50 to 500 $\mu m^2$. When the average surface area is less than 30 $\mu m^2$, the crack inhibiting effect may be lowered, whereas when the average surface area exceeds 700 $\mu m^2$, the resin layer may have a non-uniform appearance, which may result in the deterioration in aesthetics.

The shape of the resin powder is not particularly limited, and may be circular, angular particle or cylindrical.

According to an aspect of the present disclosure, the resin layer may further include a crosslinker or a pigment in addition to the base resin and the resin powder.

The crosslinker is a component that forms a crosslink between the base resins, and for example, one or more types may be selected and used from the group consisting of a melamine resin and an isocyanate resin, but is not limited thereto.

The content of the crosslinker may be appropriately controlled according to the content of the base resin, and may be preferably 3 to 10 wt % based on the total weight of the resin layer. When the content of the crosslinker is less than 3 wt %, the resin layer may not harden and the hardness may decrease. When the content of the crosslinker exceeds 10 wt %, the hardness of the resin layer may increase excessively, and cracks may occur naturally even without external stress.

The pigment is a component included in the resin layer to express color, and may be at least one selected from the group consisting of titanium oxide and anti-rust pigment, but is not limited thereto. The content of the pigment may be 10 to 35 wt % based on the total weight of the resin layer, and when the content of the pigment is less than 10 wt %, the anti-rust performance of the resin layer may be lowered, and it may be difficult to implement vivid colors of the resin layer. On the other hand, when the content of the pigment exceeds 35 wt %, the elasticity of the resin layer is lowered and cracks may occur.

According to an aspect of the present disclosure, the resin layer may be composed of a single layer or may be composed of two or more layers. The thickness of the resin layer may be 3 $\mu m$ to 30 $\mu m$. When the thickness of the resin layer is less than 3 $\mu m$, the role of the surface protection by the resin layer may be lowered, and the surface quality may be lowered due to the transfer of curves or defects on the surface of the plating layer to the surface. On the other hand, when the thickness of the resin layer exceeds 30 $\mu m$, the coating and drying speed of the resin layer is reduced, productivity is lowered, and manufacturing cost is increased, which is not preferable.

Next, a method for manufacturing a composite plated steel sheet according to another aspect of the present disclosure will be described. However, it does not mean that the composite plated steel sheet of the present disclosure should be manufactured by the following manufacturing method.

According to an aspect of the present disclosure, the method may include preparing a base steel sheet. In this case, the type of the base steel sheet is not particularly limited. The base steel sheet may be a Fe-based base steel sheet, that is, a hot-rolled steel sheet or a cold-rolled steel sheet, which is used as a base steel sheet of the conventional hot-dip galvanized steel, but is not limited thereto. In addition, the base steel sheet may be, for example, carbon steel, ultra-low carbon steel, or high manganese steel used as a material for automobile, but is not limited thereto.

According to an aspect of the present disclosure, the method may include plating a hot-dip zinc alloy by immersing the base steel sheet in a plating bath containing, by wt %, Mg: 1.0 to 6.0%, Al: 1.5 to 13%, Si: 0.3% or less (excluding 0%), and the balance being Zn and other unavoidable impurities. In order to manufacture the plating bath having the compositions described above, a composite ingot containing predetermined Zn, Al, and Mg or a Zn—Mg and Zn—Al ingot containing individual components may be used. Meanwhile, in regard to the components of the plating bath, the description of the components of the plating layer described above can be equally applied except for the content of Fe introduced from the base steel sheet.

In addition, according to an aspect of the present disclosure, the temperature of the plating bath is maintained at 440 to 520° C. to perform the dissolution. As the temperature of the plating bath rises, it is possible to secure fluidity in the plating bath and form the uniform composition, and it is possible to reduce the amount of floating dross. When the temperature of the plating bath is less than 440° C., the dissolution of the ingot is very slow, and it may be difficult to secure excellent plating layer surface quality due to the high viscosity of the plating bath. On the other hand, when the temperature of the plating bath exceeds 520° C., not only may ash defects occur on the plating surface due to evaporation of Zn, but also excessive diffusion of Fe may lead to excessive formation of outburst phases. The temperature of the plating bath may be maintained at 20 to 80° C. higher than the melting point of the plating bath.

After immersing the base steel sheet in the above-described plating bath, the bathing time may range from 1 to 6 seconds.

In addition, according to an aspect of the present disclosure, the method may include starting cooling from a molten metal surface of the plating bath and cooling with an inert gas at an average cooling rate of 3 to 30° C./s up to a top roll section. In this case, when the cooling rate from the molten metal surface of the plating bath to the top roll section is less than 3° C./s, the $MgZn_2$ structure may develop too coarsely and the surface of the plating layer may become severely curved. In addition, a Zn—$MgZn_2$ binary or Al—Zn—$MgZn_2$ ternary eutectic structure is widely formed, which may be disadvantageous in securing uniform corrosion resistance and processability. On the other hand, when the cooling rate from the molten metal surface of the plating bath to the top roll section exceeds 30° C./s, solidification begins from a liquid phase to a solid phase during the hot dip plating process, and rapid solidification occurs in the temperature range during which all liquid phases are changed to the solid phase, so the size of the $MgZn_2$ structure may be formed too small, resulting in locally non-uniform corrosion resistance. In addition, the uniform growth of the Fe—Zn—

Al phase may be insufficient and concentrated at the interface between the plating layer and the base steel sheet, resulting in poor processability, and the manufacturing cost may increase due to the increased use of nitrogen for excessive cooling rate.

According to an aspect of the present disclosure, the inert gas may include one or more of $N_2$, Ar, and He, and it is preferable to use $N_2$ or $N_2$+Ar in terms of reducing the manufacturing cost.

According to an aspect of the present disclosure, the surface oxide may be removed by performing shot blast treatment on the surface of the base steel sheet before plating. The method may include making the base steel sheet have a surface shape of Ra: 0.5 to 3.0 μm, Rz: 1 to 20 μm, Rpc: 10 to 100 (count/cm) through the shot blast treatment.

According to an aspect of the present disclosure, through shot blasting, the base steel sheet is controlled to have a surface shape of Ra: 0.5 to 3.0 μm, Rz: 1 to 20 μm, Rpc: 10 to 100 (count/cm) to activate the reactivity on the surface of the base steel sheet, so solidification nucleation may be formed more uniformly during the solidification of the plating layer. Therefore, not only may the plated steel sheet with excellent surface quality be obtained, but also excellent processability may be secured by preventing the local formation of crack origins during the processing through the formation of the uniform structure on the surface.

In addition, according to an aspect of the present disclosure, during the shot blast treatment, the diameter of the metal ball used may be 0.3 to 10 μm, the operating speed of the steel plate may be controlled to be 50 to 150 mpm (meter per minute), or metal balls of 300 to 3,000 kg/min may be controlled to collide with the surface of the steel plate.

That is, according to an aspect of the present disclosure, the shot blast treatment may be performed by making a metal ball of 300 to 3,000 kg/min collide with a steel plate running at an operating speed of 50 to 150 mpm using a metal ball having a diameter of 0.3 to 10 μm.

According to an aspect of the present disclosure, by performing the shot blast treatment before plating the base steel sheet to satisfy the above-described conditions for the base steel sheet before plating, the surface of the base steel sheet may be activated so that the inhibition layer may be quickly and uniformly formed by introducing mechanical potential before surface plating, or the generation of the solidification nucleus may be formed more uniformly during the solidification of the plating layer.

That is, by satisfying the above-described conditions during the shot blast treatment, it is possible to prevent the problem in that the structure is formed rough due to the harsh shot blast treatment, resulting in the deterioration in the processability, or the degree of activation of the surface of the base steel sheet before plating is low due to the insufficiently shot blast treatment, resulting in the deterioration in the uniformity of the surface.

Therefore, by performing the shot blast treatment on the base steel sheet before plating and optimizing the treatment conditions of the shot blast, it is possible to easily manufacture the plated steel sheet that satisfies one or more conditions of the Ra, Rz, cross-section hardness and thickness of the plating layer in the specific range described above.

According to an aspect of the present disclosure, in order to form the resin layer on the plating layer, foreign objects attached to the surface of the plating layer may be removed by first cleaning the plating layer with an alkali degreaser. Thereafter, the chromate film treatment may be performed on the plating layer to form a chromium coating layer.

Next, a primer coating layer having a thickness of 3 to 30 μm may be formed by painting a primer coating material on the chromium coating layer. As the primer paint, a paint having excellent adhesion and corrosion resistance to the plated steel sheet and excellent adhesion to the top paint to be described later may be used. For example, a paint containing 40 to 80 wt % of base resin such as polyester, 5 to 10 wt % of melamine crosslinker, 10 to 30 wt % of $TiO_2$, 10 to 40 wt % of aromatic hydrocarbon or ester solvent, and 2 to 5 wt % of other additives may be used as a primer paint according to an aspect of the present disclosure.

A resin layer according to one aspect of the present disclosure may be formed by applying a top paint on the primer coating layer formed by drying the primer paint at a temperature of 150 to 300° C., and then drying the top paint at a temperature of 50 to 300° C. In this case, as described above, the top paint may contain a base resin and resin powder having a hardness 1.1 to 2 times greater than the base resin, and may contain, for example, 30 to 65 wt % of base resin, 3 to 8 wt % of crosslinker, 5 to 25 wt % of pigment, 5 to 30 wt % of solvent, and 2 to 3 wt % of other additives. The resin layer formed in this way may contain 5 to 30 vol % of resin powder compared to the volume of the resin layer.

MODE FOR INVENTION

EXAMPLE

Hereinafter, examples of the present disclosure will be described in detail. The following examples are only for understanding of the present disclosure, but do not limit the present disclosure.

In Tables 1 to 6, the remaining components other than a base resin, resin powder, a crosslinker, and a pigment are solvents and other additives.

Experimental Example 1: Performance Evaluation of Composite Plated Steel Sheet According to Hardness Ratio of Base Resin and Resin Powder With respect to a base steel sheet containing, by wt %, C: 0.03%, Si: 0.7%, Mn: 0.5%, P: 0.003%, S: 0.002%, Al: 0.05%, and the balance being Fe and other unavoidable impurities, a plating layer containing, by wt %, Mg: 5.2%, Al: 12.5%, and Si: 0.005% was formed.

A resin solution was applied on the plating layer to have compositions shown in Table 1 below, and then dried to form the resin layer. After separately manufacturing plate-shaped specimens of a base resin material and a resin powder material, the hardness of the base resin and the resin powder was measured using a D-type Shore hardness tester.

TABLE 1

| | Base resin | | | Resin powder | | | Crosslinker | | Pigment | |
|---|---|---|---|---|---|---|---|---|---|---|
| | Type | Content (wt %) | Hardness (HSD) | Type | Content (wt %) | Hardness (HSD) | Type | Content (wt %) | Type | Content (wt %) |
| Example 1 | Polyester | 30 | 65 | Polyurethane | 25 | 110 | Melamine | 5 | $TiO_2$ | 25 |
| Example 2 | Polyester | 55 | 70 | Polyurethane | 5 | 80 | Melamine | 6 | $TiO_3$ | 15 |
| Example 3 | Polyester | 60 | 60 | Polyurethane | 12 | 90 | Melamine | 8 | $TiO_4$ | 15 |
| Example 4 | Polyester | 40 | 65 | Polyurethane | 25 | 72 | Melamine | 8 | $TiO_6$ | 10 |
| Example 5 | Ethylene | 65 | 75 | Polyurethane | 5 | 90 | Melamine | 7 | $TiO_2$ + $Cr_2O_3$ | 5 |
| Example 6 | Ethylene | 60 | 65 | Polyurethane | 5 | 110 | Isocyanate | 3 | $TiO_2$ + $Fe_2O_3$ | 8 |
| Comparative Example 1 | Polyester | 55 | 50 | Polyurethane | 5 | 110 | Melamine | 3 | $TiO_2$ | 15 |
| Comparative Example 2 | Polyester | 40 | 60 | Polyester | 20 | 55 | Melamine | 8 | $TiO_2$ | 15 |

After manufacturing the composite plated steel sheet specimen by cutting the composite plated steel sheet of Table 1 into 7 cm×15 cm in width×length, the performance of the composite plated steel sheet was evaluated.

<Evaluation of Crack Spread Inhibition Performance>

After performing the bending processing of bending at 180° with respect to a center line of the cut composite plated steel sheet specimen to make both sides contact, cracks generated in a coating layer were observed. The degree of occurrence of cracks was evaluated according to the following evaluation criteria.

⊚: No cracks in the coating on the bending line
○: Less than 5 defects with a crack length of 1 mm or less occurred in the coating along the bending line
Δ: Occurrence of 5 or more and less than 10 fine cracks within 1 mm in length
X: Occurrence of 10 or more defects within 1 mm in length or 1 or more defects having a length of 1 mm or more <Evaluation of Post-Formation Corrosion Resistance>

As described above, the occurrence of white rust was observed by a test method according to ISO14993 using a salt spray tester for the specimen of the composite plated steel sheet subjected to the bending processing. The post-formation corrosion resistance was evaluated according to the following evaluation criteria.

⊚: No white rust on the surface of the bending line after 500 hours or more have elapsed
○: Occurrence of white rust for 300 hours or more and within 500 hours
Δ: Occurrence of white rust for 100 hours or more and within 300 hours
X: Occurrence of white rust within 100 hours

TABLE 2

| | Resin powder hardness/base resin hardness | Crack spread inhibition performance | Post-formation corrosion resistance |
|---|---|---|---|
| Example 1 | 1.7 | ⊚ | ⊚ |
| Example 2 | 1.1 | ⊚ | ⊚ |
| Example 3 | 1.5 | ⊚ | ⊚ |
| Example 4 | 1.1 | ⊚ | ⊚ |
| Example 5 | 1.2 | ⊚ | ⊚ |
| Example 6 | 1.7 | ⊚ | ⊚ |
| Comparative Example 1 | 2.2 | X | X |
| Comparative Example 2 | 0.9 | X | X |

Referring to Table 2, in the case of Examples 1 to 6 in which a hardness ratio of the resin powder and the base resin satisfies the range of the present disclosure, it could be seen that both the crack spread inhibition performance and post-formation corrosion resistance are excellent. On the other hand, in Comparative Examples 1 and 2, in which the hardness ratio of the resin powder and the base resin was outside of the range of the present disclosure, the crack spread inhibition performance and post-formation corrosion resistance significantly deteriorate.

Experimental Example 2: Performance Evaluation of Composite Plated Steel Sheet According to Composition of Resin Solution A plating layer having the same composition as in Experimental Example 1 was formed on the same base steel sheet as in Experimental Example 1. The resin solution was applied on the plating layer to have compositions shown in Table 3 below, and then dried to form the resin layer.

TABLE 3

| | Base resin | | | Resin powder | | | Crosslinker | | Pigment | |
|---|---|---|---|---|---|---|---|---|---|---|
| | Type | Content (wt %) | Hardness (HSD) | Type | Content (wt %) | Hardness (HSD) | Type | Content (wt %) | Type | Content (wt %) |
| Example 1 | Polyester | 30 | 65 | Polyurethane | 25 | 110 | Melamine | 5 | $TIO_2$ | 25 |
| Example 2 | Polyester | 55 | 70 | Polyurethane | 5 | 80 | Melamine | 6 | $TIO_3$ | 15 |
| Example 3 | Polyester | 60 | 60 | Polyurethane | 12 | 90 | Melamine | 8 | $TIO_4$ | 15 |
| Example 4 | Polyester | 40 | 65 | Polyurethane | 25 | 72 | Melamine | 9 | $TIO_5$ | 10 |
| Example 5 | Ethylene | 65 | 75 | Polyurethane | 5 | 90 | Melamine | 7 | $TiO_2 + Cr_2O_3$ | 5 |
| Example 6 | Ethylene | 60 | 65 | Polyurethane | 5 | 110 | Isocyanate | 3 | $TIO_2 + Fe_2O_3$ | 8 |
| Comparative Example 3 | Polyester | 25 | 70 | Polyurethane | 20 | 80 | Melamine | 5 | $TIO_2$ | 20 |
| Comparative Example 4 | Polyester | 70 | 75 | Polyurethane | 5 | 90 | Melamine | 3 | $TIO_2$ | 5 |
| Comparative Example 5 | Polyester | 45 | 60 | Polyurethane | 0 | 0 | Melamine | 8 | $TIO_2$ | 15 |
| Comparative Example 6 | Polyester | 40 | 65 | Polyurethane | 2 | 90 | Melamine | 8 | $TIO_2$ | 25 |

After manufacturing the composite plated steel sheet specimen by cutting the composite plated steel sheet of Table 3 into 7 cm×15 cm in width×length, the performance of the composite plated steel sheet was evaluated, and the evaluation results were shown in the following Table 4.

Figure 2:
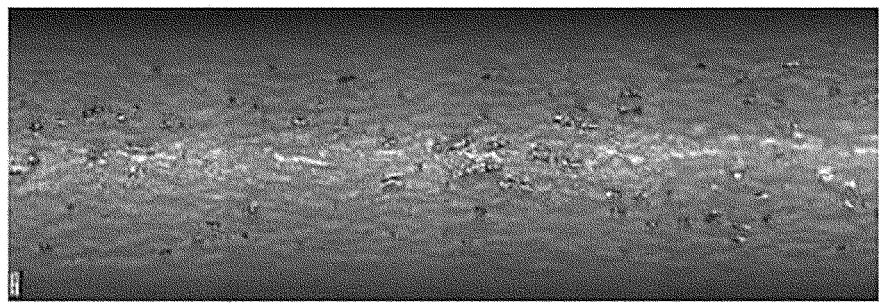
FIG. 2 is a diagram of an observed bending line after performing bending processing on a composite plated steel sheet specimen of Comparative Example 5.

In addition, after performing the bending processing on the composite plated steel sheet specimens of Example 5 and Comparative Example 5, the results of observing the bending lines were shown in FIGS. 1 and 2, respectively.

TABLE 4

| | Resin powder hardness/base resin hardness | Crack spread inhibition performance | Post-formation corrosion resistance |
|---|---|---|---|
| Example 1 | 1.7 | ⊚ | ⊚ |
| Example 2 | 1.1 | ⊚ | ⊚ |
| Example 3 | 1.5 | ⊚ | ⊚ |
| Example 4 | 1.1 | ⊚ | ⊚ |
| Example 5 | 1.2 | ⊚ | ⊚ |
| Exempla 8 | 1.7 | ⊚ | ⊚ |
| Comperetive Example 3 | 1.1 | Δ | Δ |
| Comparative Example 4 | 1.2 | Δ | Δ |
| Comparative Example 5 | 0.0 | X | X |
| Comparative Example 6 | 1.4 | Δ | X |

Referring to Table 4, Examples 1 to 6 in which the resin layer had the composition according to the present disclosure showed excellent results in both the crack spread inhibition performance and post-formation corrosion resistance. On the other hand, when the composition of the resin layer was outside of the range of to the present disclosure, the crack spread inhibition performance and post-formation corrosion resistance showed poor results even if the hardness ratio of the resin powder and the base resin satisfied the range of the present disclosure. In particular, it was confirmed that cracks did not occur in the composite plated steel sheet of Example 5 (FIG. 1), but many cracks occurred in the coating layer in the composite plated steel sheet of Comparative Example 5 (FIG. 2).

Experimental Example 3: Performance Evaluation of Composite Plated Steel Sheet According to Volume Ratio of Resin Powder A plating layer having the same composition as in Experimental Example 1 was formed on the same base steel sheet as in Experimental Example 1. A resin solution containing a polyester resin, polyurethane resin powder, a melamine crosslinker, and a $TiO_2$ pigment was applied on the plating layer and dried to form the resin layer, to thereby manufacture the composite plated steel sheet. In this case, the hardness ratio of the resin powder to the base resin was 1.1 to 1.9.

The content (wt %) of each component in the resin layer and the volume ratio (vol %) of the resin powder were shown in Table 5 below.

After manufacturing a cross-section specimen of the resin layer and performing mirror polishing on the specimen, the distribution of the resin powder included in the resin layer was observed using a scanning electron microscope (SEM). In addition, after coloring the resin powder area, the ratio of the resin powder was measured using an image analyzer, and this value was determined as the volume ratio of the resin powder.

TABLE 5

|  | Composition of resin layer | | | | Resin powder volume ratio (vol %) | Crack spread inhibition performance | Post-formation corrosion resistance |
|---|---|---|---|---|---|---|---|
|  | Base resin (wt %) | Resin powder (wt %) | Crosslinker (wt %) | Pigment (wt %) | | | |
| Example 7 | 45 | 4 | 7 | 15 | 6 | ⊚ | ⊚ |
| Example 8 | 55 | 22 | 7 | 25 | 25 | ⊚ | ⊚ |
| Example 9 | 50 | 13 | 5 | 20 | 25 | ⊚ | ⊚ |
| Example 10 | 56 | 11 | 4 | 22 | 15 | ⊚ | ⊚ |
| Example 11 | 54 | 8 | 5 | 15 | 9 | ⊚ | ⊚ |
| Example 12 | 45 | 10 | 8 | 10 | 13 | ⊚ | ⊚ |
| Comparative Example 7 | 65 | 2 | 8 | 23 | 4 | Δ | Δ |
| Comparative Example 8 | 60 | 1 | 7 | 25 | 4 | Δ | Δ |
| Comparative Example 9 | 70 | 22 | 6 | 15 | 3 | Δ | Δ |
| Comparative Example 10 | 45 | 27 | 7 | 9 | 31 | X | Δ |
| Comparative Example 11 | 55 | 30 | 8 | 10 | 35 | X | X |
| Comparative Example 12 | 40 | 40 | 5 | 15 | 57 | X | X |

Referring to Table 5, Examples 7 to 12 in which the volume ratio of the resin powder satisfies the range of the present disclosure were excellent in the crack spread inhibition performance and post-formation corrosion resistance, but Comparative Examples 7 to 12 in which the volume ratio of the resin powder was outside of the range of the present disclosure showed poor results in the crack spread inhibition performance and post-formation corrosion resistance.

Experimental Example 4: Performance Evaluation of Composite Plated Steel Sheet According to Average Surface Area of Resin Powder A plating layer having the same composition as in Experimental Example 1 was formed on the same base steel sheet as in Experimental Example 1. A resin solution containing a polyester resin, polyurethane resin powder, a melamine crosslinker, and a $TiO_2$ pigment was applied on the plating layer and dried to form the resin layer having the compositions shown in Table 6. In this case, the hardness ratio of the resin powder to the base resin was 1.1 to 1.5.

The average surface area of the resin powder was photographed at a magnification of ×500 to ×1,000 using a scanning electron microscope (SEM), and the average surface area of the resin powder was measured by using an image analyzer after classifying the resin powder in color. The measured values are listed in Table 6 below.

After manufacturing the composite plated steel sheet specimen by cutting the composite plated steel sheet of Table 6 into 7 cm×15 cm in width×length, the performance of the composite plated steel sheet was evaluated.

TABLE 6

|  | Composition of resin layer | | | | Average surface area of resin powder (μm²) | Crack spread inhibition performance | Post-formation corrosion resistance |
|---|---|---|---|---|---|---|---|
|  | Base resin (wt %) | Resin powder (wt %) | Crosslinker (wt %) | Pigment (wt %) | | | |
| Example 13 | 55 | 8 | 8 | 10 | 50 | ⊚ | ⊚ |
| Example 14 | 45 | 5 | 7 | 12 | 54 | ⊚ | ⊚ |
| Example 15 | 40 | 4 | 6 | 15 | 60 | ⊚ | ⊚ |
| Example 16 | 55 | 6 | 8 | 11 | 100 | ⊚ | ⊚ |
| Example 17 | 57 | 7 | 8 | 10 | 490 | ⊚ | ⊚ |
| Example 18 | 61 | 6 | 4 | 9 | 80 | ⊚ | ⊚ |
| Comparative Example 13 | 45 | 10 | 4 | 15 | 10 | Δ | Δ |
| Comparative Example 14 | 55 | 11 | 5 | 15 | 15 | Δ | Δ |
| Comparative Example 15 | 45 | 11 | 8 | 14 | 26 | Δ | Δ |
| Comparative Example 16 | 40 | 10 | 8 | 15 | 710 | Δ | Δ |
| Comparative Example 17 | 50 | 8 | 7 | 14 | 750 | Δ | X |
| Comparative Example 18 | 45 | 7 | 6 | 15 | 800 | X | X |

(Referring to Table 6, Examples 13 to 18 in which the average surface area of the resin powder satisfies the range of the present disclosure were excellent in the crack spread inhibition performance and post-formation corrosion resistance, but Comparative Examples 13 to 18 in which the average surface area of the resin powder was outside of the range of the present disclosure showed poor results in the crack spread inhibition performance and post-formation corrosion resistance.

The invention claimed is:

1. A composite plated steel sheet, comprising:
a base steel sheet;
a Zn—Mg—Al-based plating layer provided on at least one surface of the base steel sheet; and
a resin layer provided on at least one surface of the Zn—Mg—Al-based plating layer,
wherein the resin layer includes a base resin and resin powder,
the resin powder includes polyurethane-based resin powder, and
a hardness of the resin powder is 1.1 to 2 times that of the base resin.

2. The composite plated steel sheet of claim 1, wherein the base resin is at least one selected from the group consisting of a polyester-based resin, a urea-based resin, an epoxy-based resin, a urethane-based resin, and an ethylene-based resin.

3. The composite plated steel sheet of claim 1, wherein the resin powder is included in an amount of 5 to 30 vol % based on a volume of the resin layer.

4. The composite plated steel sheet of claim 1, wherein an average surface area of the resin powder is 30 to 700 $\mu m^2$.

5. The composite plated steel sheet of claim 1, wherein the resin layer further includes at least one of a crosslinker and a pigment,
the crosslinker is at least one selected from the group consisting of a melamine resin and an isocyanate resin, and
the pigment is at least one selected from the group consisting of titanium oxide and a rust-preventive pigment.

6. The composite plated steel sheet of claim 5, wherein the resin layer includes 30 to 65 wt % of a base resin, 4 to 25 wt % of resin powder, 3 to 8 wt % of crosslinker, and 5 to 25 wt % of pigment, based on a total weight of the resin layer.

7. The composite plated steel sheet of claim 1, wherein the plating layer contains, by wt %, Mg: 1.0 to 6.0%, Al: 1.5 to 13%, Si: 0.3% or less (excluding 0%), and balance being Zn and other unavoidable impurities,
an average content of Fe at a ½ point of the plating layer in a thickness direction is 0.07% or less (including 0%), and
a ratio of Al and Mg (Al/Mg) is 0.7 to 3.0.

8. The composite plated steel sheet of claim 1, wherein, among the plating layer, an area containing a $MgZn_2$ phase is 10 to 80% in phase fraction, wherein the area containing the $MgZn_2$ phase means an area in which the $MgZn_2$ phase is present alone or present as alloy phases selected from Al—$MgZn_2$, Zn—Al—$MgZn_2$, and Zn—$MgZn_2$.

9. The composite plated steel sheet of claim 1, further comprising:
a Fe—Al-based inhibition layer provided between the base steel sheet and the plating layer.

10. A method for manufacturing a composite plated steel sheet, comprising:
preparing a base steel sheet;
forming a Zn—Mg—Al-based plating layer on at least one surface of the base steel sheet; and
forming a resin layer containing a base resin and resin powder on at least one surface of the Zn—Mg—Al-based plating layer,
wherein a hardness of the resin powder is 1.1 to 2 times that of the base resin, and
wherein the resin powder includes polyurethane-based resin powder.

11. The method of claim 10, wherein the base resin is at least one selected from the group consisting of a polyester-based resin, a urea-based resin, an epoxy-based resin, a urethane-based resin, and an ethylene-based resin.

12. The method of claim 10, wherein the resin powder is included in an amount of 5 to 30 vol % based on a volume of the resin layer.

13. The method of claim 10, wherein an average surface area of the resin powder is 30 to 700 $\mu m^2$.

14. The method of claim 10, wherein the resin layer further includes at least one of a crosslinker and a pigment,
the crosslinker is at least one selected from the group consisting of a melamine resin and an isocyanate resin, and
the pigment is at least one selected from the group consisting of titanium oxide and a rust-preventive pigment.

15. The method of claim 14, wherein the resin layer includes 30 to 65 wt % of a base resin, 4 to 25 wt % of resin powder, 3 to 8 wt % of crosslinker, and 5 to 25 wt % of pigment, based on a total weight of the resin layer.

* * * * *